United States Patent
Kodama (10) Patent No.: US 9,313,605 B2
(45) Date of Patent: Apr. 12, 2016

(54) WIRELESS COMMUNICATION SYSTEM AND INFORMATION PROVIDING METHOD

(71) Applicant: YOKOGAWA ELECTRIC CORPORATION, Musashino, Tokyo (JP)

(72) Inventor: Kazutoshi Kodama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 155 days.

(21) Appl. No.: 13/931,033

(22) Filed: Jun. 28, 2013

(65) Prior Publication Data

US 2014/0010111 A1    Jan. 9, 2014

(30) Foreign Application Priority Data

Jul. 4, 2012  (JP) .................................. 2012-150533

(51) Int. Cl.
*H04L 12/28*  (2006.01)
*H04L 9/32*   (2006.01)
(Continued)

(52) U.S. Cl.
CPC ........... *H04W 4/001* (2013.01); *G05B 19/4185* (2013.01); *H04L 41/0806* (2013.01); *H04W 8/18* (2013.01); *G05B 2219/31093* (2013.01); *G05B 2219/31162* (2013.01); *H04W 8/22* (2013.01);
(Continued)

(58) Field of Classification Search
CPC ......... H04W 4/001; H04W 8/22; H04W 8/26; H04W 48/02; H04W 8/18; H04L 12/04; H04L 41/0806; H04L 63/062; H04L 9/36; G05B 2219/31162

USPC ......................................................... 370/254
See application file for complete search history.

(56) References Cited

U.S. PATENT DOCUMENTS 7,706,774 B1    4/2010  Lee et al.
2009/0125713 A1*  5/2009  Karschnia et al. ............ 713/153
(Continued)

FOREIGN PATENT DOCUMENTS

EP    2418553 A2     2/2012
WO    2009/120138 A1 10/2009
WO    2011/053078 A2  5/2011

OTHER PUBLICATIONS

Shuji Yamamoto, et al., "Field Wireless Solution Based on ISA100. 11a to Innovate Instrumentation", Yokogawa Technical Report, 2010, pp. 7-12, vol. 53, No. 2.
(Continued)

*Primary Examiner* — Edan Orgad
*Assistant Examiner* — Vanneilian Lalchinthang
(74) *Attorney, Agent, or Firm* — Sughrue Mion, PLLC (57) ABSTRACT

A wireless communication system according to one aspect of the present invention includes a provisioning device, a gateway, and a management device. The provisioning device sets to a wireless device, provisioning information required for the wireless device to join a wireless communication network. The gateway determines, using the provisioning information set by the provisioning device, whether or not to allow the wireless device to join the wireless communication network. The management device manages join history information including the provisioning information set by the provisioning device and join information associated with the provisioning information, the join information indicating a result of the determination by the gateway, and provides the join history information to the provisioning device in response to a request from the setting device.

20 Claims, 5 Drawing Sheets

(51) Int. Cl.
   *H04L 9/36*      (2006.01)
   *H04W 4/00*      (2009.01)
   *H04L 12/24*     (2006.01)
   *G05B 19/418*    (2006.01)
   *H04W 8/18*      (2009.01)
   H04W 8/22        (2009.01)
   H04W 8/26        (2009.01)
   H04W 48/02       (2009.01)

(52) U.S. Cl.
   CPC ............... *H04W 8/26* (2013.01); *H04W 48/02* (2013.01); *Y02P 90/18* (2015.11)

(56) References Cited

U.S. PATENT DOCUMENTS

| | | | |
|---|---|---|---|
| 2009/0222242 A1* | 9/2009 | Kodama | 702/188 |
| 2009/0292915 A1* | 11/2009 | Sakane | 713/155 |
| 2009/0296601 A1* | 12/2009 | Citrano et al. | 370/254 |
| 2010/0049984 A1* | 2/2010 | Masushio et al. | 713/179 |
| 2010/0290351 A1* | 11/2010 | Toepke et al. | 370/250 |
| 2012/0040698 A1* | 2/2012 | Ferguson et al. | 455/457 |
| 2013/0318343 A1* | 11/2013 | Bjarnason et al. | 713/157 |

OTHER PUBLICATIONS

Shuji Yamamoto, et al., "World's First Wireless Field Instruments Based on ISA100.11a", Yokogawa Technical Report, 2010, pp. 13-16, vol. 53, No. 2.

* cited by examiner

| No. | DEVICE EUI64 | VENDOR /DEVICE TYPE | DEVICE TAG | NETWORK ID | JOINING INFORMATION (ACQUISITION TIME) | HISTORY OF SUCCESSFUL JOINING | IMPORT TIME | PROVISIONING NUMBER OF TIMES |
|---|---|---|---|---|---|---|---|---|
| | | A1 | | | B1 | | C1 | |
| 1 | XXXX:XXXX:XXXX:XXXX | Yokogawa /EJX | PT100 | 100 | UNSUCCESSFUL JOINING (2011/09/10 17:00) | NONE | 2011/09/01 13:00 | FIRST |
| 2 | YYYY:YYYY:YYYY:YYYY | Yokogawa /YTA | TT100 | 101 | DURING JOINING (2011/09/10 17:00) | DURING JOINING (2011/09/10 17:00) | 2011/09/03 14:00 | FIRST |
| 3 | ZZZZ:ZZZZ:ZZZZ:ZZZZ | Yokogawa /YTMX | TTM200 | 101 | UNSUCCESSFUL JOINING (2011/09/10 17:00) | PRESENT (SEE No. 4) | 2011/09/10 17:00 | SECOND |
| 4 | ZZZZ:ZZZZ:ZZZZ:ZZZZ | Yokogawa /YTMX | TTM200 | 101 | EXPIRATION OF TIME LIMIT (2011/09/10 17:00) | PRESENT (2011/09/09 18:00) | 2011/08/01 11:00 | FIRST |
| ...... | ...... | ...... | ...... | ...... | ...... | ...... | ...... | ...... |

WIRELESS COMMUNICATION SYSTEM AND INFORMATION PROVIDING METHOD

BACKGROUND OF THE INVENTION

1. Field of the Invention

The present invention relates to a wireless communication system and an information providing method.

Priority is claimed on Japanese Patent Application No. 2012-150533, filed Jul. 4, 2012, the content of which is incorporated herein by reference.

2. Description of the Related Art

Recently, wireless communication systems have been implemented in plants, factories, or the like. In such a wireless communication system, site apparatuses (a measurement unit, an operation unit) called "wireless field apparatuses" which can perform wireless communication are provided in a plant or the like, and control signals for controlling the wireless field apparatuses, measurement signals acquired by the wireless field apparatuses, and the like, are transmitted via a wireless communication network. The communication standard used for such a wireless communication system includes, for example, ISA100.11a, which is the wireless communication standard for industrial automation and defined by an ISA (international society of automation).

For wireless devices such as the above wireless field apparatus to participate in the wireless communication network, it is necessary to perform a process called "provisioning" on the wireless device, and previously set information required for participating in the wireless communication network (provisioning information). Here, the provisioning information includes, for example, a device tag allocated to each wireless device, an ID of the wireless communication network in which a wireless device tries to participate, and the like.

Provisioning methods include OTA (over the air) provisioning and OOB (out-of-band) provisioning. The OTA provisioning is a method such that provisioning is performed via the wireless communication network in which a wireless device is trying to participate. On the other hand, the OOB provisioning is a method such that provisioning is performed using a communication means different from the wireless communication network in which the wireless device is trying to participate (for example, serial communication, such as infrared communication and RS-232C).

Shuji Yamamoto et al. "Field Wireless Solution Based on ISA100.11a to Innovate Instrumentation" and "World's First Wireless Field Instruments Based on ISA100.11a", Yokogawa Technical Report, Vol. 53, No. 2, 2010, disclose an example of a communication system in which control signals for controlling wireless field apparatuses, measurement signals acquired by the wireless field apparatuses, and the like, are transmitted via a wireless communication network based on the above communication standard ISA100.11a. Additionally, the former document "Field Wireless Solution Based on ISA100.11a to Innovate Instrumentation" also discloses a provisioning device (apparatus parameter setting tool) that performs provisioning on a wireless field apparatus trying to participate in the wireless communication network.

Regardless of whether the provisioning is OTA provisioning or the OOB provisioning, the provisioning is performed basically by the following steps (S1) to (S5). Here, in a case where it is necessary to perform provisioning on multiple wireless devices, the following steps (S1) to (S5) are repeated a number of times equal to the number of wireless devices.

(S1) An operator acquires identification information from the wireless device by operating a device for performing provisioning (hereinafter, a "provisioning device").

(S2) The operator refers to a white list (a correspondence table in which identification information of a wireless device is associated with provisioning information to be set to the wireless device), and specifies provisioning information to be set to the wireless device corresponding to the acquired identification information.

(S3) The operator inputs the specified provisioning information to the provisioning device.

(S4) By operating the provisioning device, the operator sets to the wireless device, the provisioning information input to the provisioning device.

(S5) The operator confirms whether or not the provisioning succeeds (whether or not setting of the provisioning information to the wireless device is successfully completed).

Here, provisioning includes provisioning for setting new provisioning information to the wireless device to which the provisioning information has been set (hereinafter, "reprovisioning"), in addition to the provisioning for setting provisioning information to the wireless device to which the provisioning information has not been set. The reprovisioning is performed in a case where a wireless device having been subjected to the provisioning is unable to participate in a wireless communication network for some reason, in a case where a wireless device participating in a wireless communication network is reallocated to another wireless communication network, or the like.

The reprovisioning is performed also in a case where the state of a wireless device is returned to the original state. For example, in a case where a wireless device previously subjected to reprovisioning is unable to participate in the wireless communication network for some reason, reprovisioning is newly performed to return the state of that wireless device to the state as before the reprovisioning.

Similar to the provisioning, the reprovisioning is performed basically by the above steps (S1) to (S5). For this reason, each time reprovisioning is necessary, an operator has to repeat similar steps, thus causing low work efficiency. Additionally, similar to the provisioning, reprovisioning requires that an operator specify provisioning information by referring to the white list, and input the specified provisioning information to a provisioning device, thereby making it likely to cause erroneous operation.

SUMMARY

A wireless communication system according to one aspect of the present invention includes, but is not limited to: a setting device; a control device; and a management device. The setting device is configured to set to a first wireless device, first information required for the first wireless device to join a wireless communication network. The control device is configured to be set the first information by the setting device. The control device is configured to determine, using the first information, whether or not to allow the first wireless device transmitting a request for joining the wireless communication network to join the wireless communication network. The management device is configured to be set the first information by the setting device. The management device is configured to manage join history information for each wireless device. The join history information includes the first information and second information associated with the first information. The second information indicates a result of the determination. The management device is configured to provide the join history information to the setting device in response to a request from the setting device.

An information providing method for a control device according to another aspect of the present invention includes, but is not limited to: controlling a setting device to set to a first wireless device, first information required for the first wireless device to join a wireless communication network; determining, using the first information, whether or not to allow the first wireless device transmitting a request for joining the wireless communication network to join the wireless communication network; generating join history information for each wireless device, the join history information including the first information and second information associated with the first information, and the second information indicating a result of the determination; and providing the join history information to the setting device in response to a request from the setting device.

A wireless communication system according to another aspect of the present invention includes, but is not limited to: a first wireless device; a management device; a setting device; and a control device. The management device is configured to manage first join history information including first information and second information. The first information is required for the first wireless device to join a wireless communication network. The second information indicates a history of the first wireless device concerning previous join in the wireless communication network. The setting device is configured to acquire the first join history information from the management device, and set to the first wireless device, the first information included in the first join history information. The control device is configured to receive the first information from the setting device, and in a case that a first request for joining the wireless communication network is received from the first wireless device, determine whether or not to accept the first request based on the first information.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE PREFERRED EMBODIMENTS

The present invention will now be described herein with reference to illustrative embodiments. The accompanying drawings explain a wireless communication system and an information providing method of the embodiments. The size, the thickness, and the like of each illustrated portion might be different from those of each portion of an actual system or device.

Those skilled in the art will recognize that many alternative embodiments can be accomplished using the teachings of the present invention and that the present invention is not limited to the embodiments illustrated herein for explanatory purposes.

Figure 1:
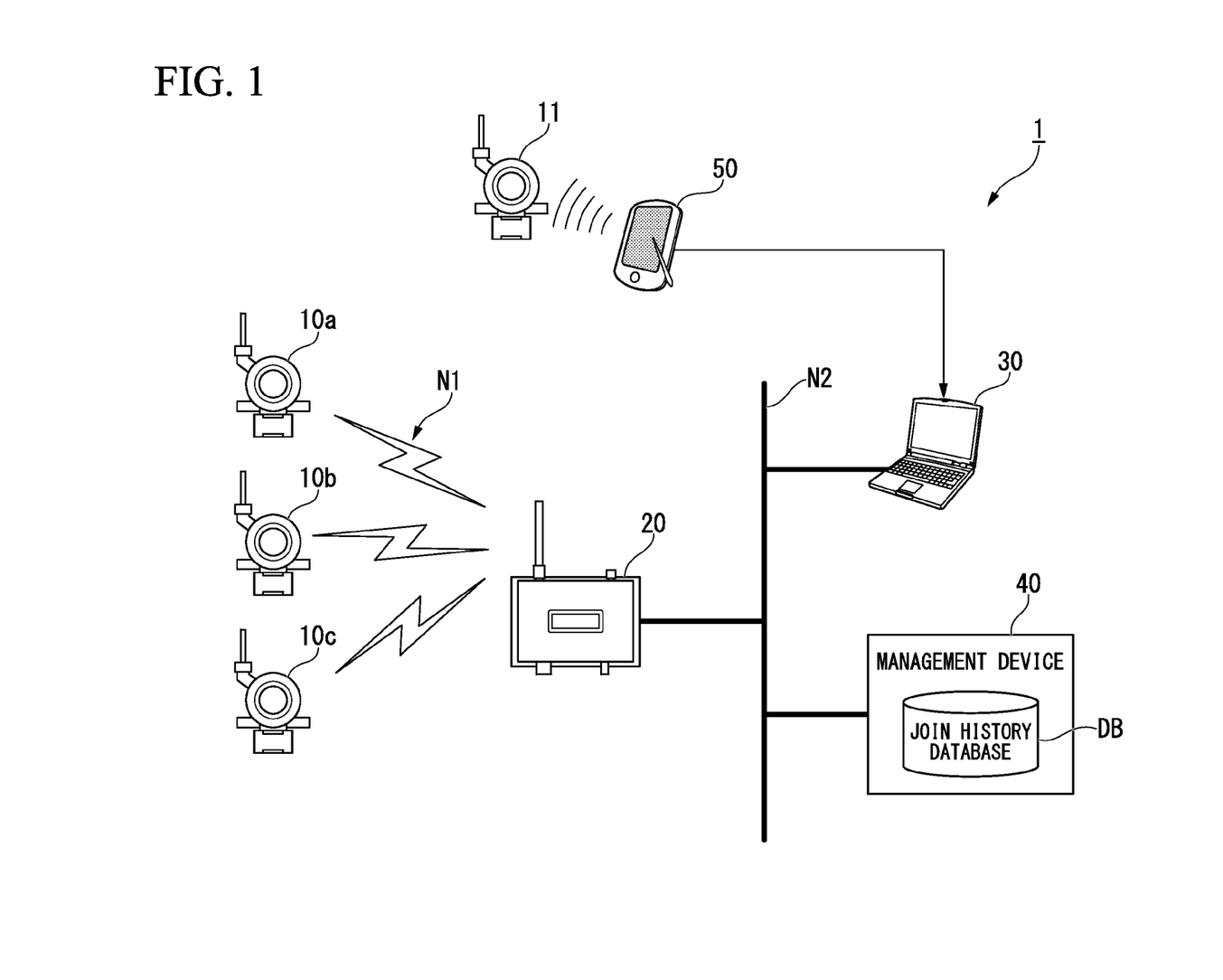
FIG. 1 is a block diagram illustrating the entire configuration of a wireless communication system according to an embodiment of the present invention.

Hereinafter, a wireless communication system and an information providing method according to an embodiment of the present invention is explained in detail. FIG. 1 is a block diagram illustrating the entire configuration of a wireless communication system 1 according to the present embodiment. As shown in FIG. 1, the wireless communication system 1 includes: wireless devices 10a to 10c; a wireless device 11 (first wireless device); a gateway 20 (control device); a monitoring terminal device 30; a management device 40; and a provisioning device 50 (setting device). Under control of the gateway 20, the wireless devices 10a to 10c can communicate with the monitoring terminal device 30 and the like via a wireless communication network N1.

Here, the wireless devices 10a to 10c shown in FIG. 1 denote wireless devices participating in the wireless communication network N1. The wireless device 11 denotes a wireless device trying to participate in the wireless communication network N1. Here, the number of the wireless devices 10a to 10c and the number of the wireless device 11 are not limited to those shown in FIG. 1.

The wireless devices 10a to 10c and the wireless device 11 include, for example, a sensor apparatus such as a flowmeter and a thermometer, a valve apparatus such as a flow amount control valve and an open-close valve, an actuator apparatus such as a fan and a motor, and other field apparatuses to be provided in a site such as a plant and a factory. Those wireless devices 10a to 10c and the wireless device 11 can perform wireless communication based on ISA100.11a, the wireless communication standard for industrial automation.

Additionally, the wireless devices 10a to 10c and the wireless device 11 have an infrared communication function, and can transmit and receive various informations to and from external infrared communication apparatuses. For this reason, the wireless device 11 not participating in the wireless communication network N1 performs infrared communication with the provisioning device 50, thus acquiring information required for participating in the wireless communication network N1 (provisioning information; first information). Further, the wireless devices 10a to 10c participating in the wireless communication network N1 appropriately perform infrared communication with the provisioning device 50, thus acquiring new provisioning information. Here, the above provisioning information includes a device tag allocated to each of the wireless devices 10a to 10c, and 11, a network ID allocated to the wireless communication network N1, and the like.

The gateway 20 connects the wireless communication network N1 formed by the wireless devices 10a to 10c, and a wired plant network N2 to which the monitoring terminal device 30 and the management device 40 are connected. The gateway 20 relays various data transmitted between the monitoring terminal device 30 and each of the wireless devices 10a to 10c. The gateway 20 performs wireless communication based on the above wireless communication standard ISA100.11a.

Additionally, the gateway 20 manages and controls wireless communication performed via the wireless communication network N1. Specifically, the gateway 20 manages and controls a frequency channel, a communication schedule, resources such as communication paths, and the like, which are of the wireless communication network N1. Further, the gateway 20 performs a process of determining whether or not to cause the wireless device 11 to participate in the wireless communication network N1 (joining process), using provisioning information set by the provisioning device 50 (provisioning information acquired via the monitoring terminal device 30).

The monitoring terminal device 30 is connected to the wired plant network N2. The monitoring terminal device 30 is operated by, for example, an operator of the wireless communication system 1. In accordance with instructions from the operator, the monitoring terminal device 30 performs collection of measurement data measured by the wireless devices 10a to 10c, setting of parameters for the wireless devices 10a to 10c, and the like. Additionally, in accordance with instructions from the operator, the monitoring terminal device 30 reads (imports) the provisioning information set to the provisioning device 50, and writes (downloads) the imported provisioning information to the gateway 20 and the management device 40. Further, when a request is received from the provisioning device 50, the monitoring terminal device 30 provides to the provisioning device 50, the contents of the join history database DB managed by the management device 40.

The management device 40 manages a join history database DB storing join history information for each wireless device (join history information; particularly, join history information of the first wireless device is referred to as first join history information). The join history database DB is a database storing join history information including the provisioning information downloaded from the monitoring terminal device 30, and information indicating a result of the joining process performed by the gateway 20 (joining information: second information indicating a history of the first wireless device concerning previous join in the wireless communication network) in association with the provisioning information. Additionally, when a request is received from the monitoring terminal device 30 (a request from the provisioning device 50), the management device 40 provides the contents of the join history database DB to the monitoring terminal device 30. In other words, the management device 40 provides the contents of the join history database DB indirectly to the provisioning device 50 via the monitoring terminal device 30. Here, the details of the join history database DB will be explained later.

The provisioning device 50 is operated by the operator who performs setting of the wireless device 11 not participating in the wireless communication network N1 and reprovisioning of the wireless devices 10a to 10c participating in the wireless communication network N1. The provisioning device 50 performs setting of various informations to the wireless devices 11. Specifically, the provisioning device 50 sets to the wireless device 11, provisioning information required for causing the wireless device 11 to participate in the wireless communication network N1.

Here, the provisioning device 50 has a wireless communication function based on the above wireless communication standard ISA110.11a, an infrared communication function, a serial communication function such as RS-232C. For this reason, the provisioning device 50 can perform both the OTA provisioning and the OOB provisioning. The OTA provisioning is provisioning performed on the wireless device 11 via the wireless communication network N1 in which the wireless device 11 is trying to participate. The OOB provisioning is provisioning performed using a communication means (infrared communication and serial communication such as RS-232C) different from the wireless communication network N1. Additionally, the provisioning device 50 also has a broadband wireless communication function, and therefore can access the monitoring terminal device 30 via, for example, a broadband wireless communication network.

Figure 2:
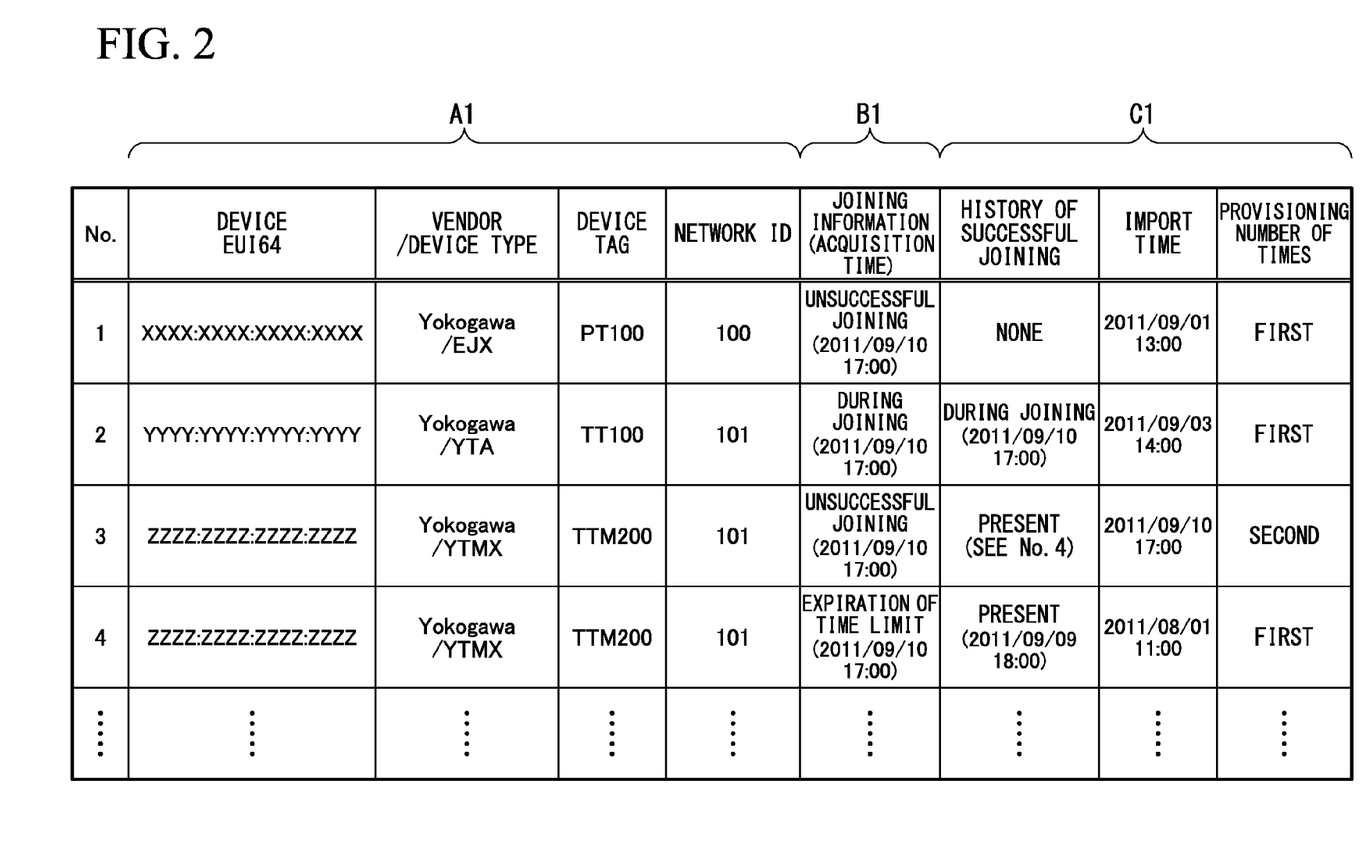
FIG. 2 is a chart illustrating an example of the contents of a join history database according to the embodiment of the present invention.

FIG. 2 is a chart illustrating an example of the contents of the join history database according to the embodiment of the present invention. As shown in FIG. 2, the join history database DB is a database storing multiple join history informations each including: provisioning information A1 downloaded from the monitoring terminal device 30; joining information B1 indicating a result of the joining process performed by the gateway 20; and a supplemental information C1, which are associated with one another. Here, each join history information stored in the join history database DB is allocated with a sequential number ("No." shown in FIG. 2).

The provisioning information A1 includes "device EUI64", "vendor/device type", "device tag", "network ID", and the like. The "device EUI 64" is 64-bit information allocated to each wireless device to uniquely identify the wireless device. The "vendor/device type" is information indicating the type of the vendor providing a wireless device and the type of the wireless device. The "tag" is information allocated to each wireless device in order for the operator to easily identify the wireless device. The "network ID" is an identifier allocated to a wireless communication network in which the wireless device is trying to participate.

The "device EUI64" and the "vendor/device type" are acquired by, for example, the provisioning device 50 by communicating with the wireless device 11. The "network ID" and the "device tag" are input to the provisioning device 50 by, for example, the operator that installs the wireless device 11.

The joining information B1 is information indicating a result of the joining process performed by the gateway 20. The joining information B1 includes the time at which the management device 40 acquires the joining information B1 from the gateway 20. The joining information B1 includes, for example, "unsuccessful joining", "during joining", "expiration of time limit", and the like. "Unsuccessful joining" is information indicating that the joining process has failed. The "during joining" is information indicating that the joining process has succeeded and is in process of joining the wireless communication network N1. Additionally, the "expiration of time limit" is information indicating that the time limit set to the provisioning information has expired and thus the joining process has failed.

The supplemental information C1 includes "history of successful joining", "import time", "the provisioning number of times", and the like. The "history of successful joining" is information indicating whether or not the wireless device (wireless device specified by the "device EUI64" included in the provisioning information A1 associated with the supplemental information C1) has previously succeeded in the joining process. The "import time" is information indicating the time at which the provisioning information A1 is imported from the provisioning device 50 to the monitoring terminal device 30. The "provisioning number of times" is information indicating the number of times provisioning has been performed on the wireless device (wireless device specified by the "device EUI64" included in the provisioning information A1 associated with the supplemental information C1). Here, in a case where reprovisioning is performed on the wireless device, "the provisioning number of times" is greater than or equal to "2".

Referring to FIG. 2, regarding the join history information allocated with the sequential number "1", the joining information B1 indicates "unsuccessful joining", and "the provisioning number of times" of the supplemental information C1 indicates 1. For this reason, it is understood that the wireless device having the "device EUI64" of XXXX:XXXX:XXXX:

XXXX has previously been subjected to provisioning, but failed to participate in the wireless communication network N1, thus requiring reprovisioning.

Additionally, regarding the join history information allocated with the sequential number "3", the joining information B1 indicates "unsuccessful joining", and "the provisioning number of times" of the supplemental information C1 indicates "2". Further, regarding the join history information allocated with the sequential number "4", the joining information B1 indicates "expiration of time limit", and "the provisioning number of times" of the supplemental information C1 indicates "1". Those join history informations are informations concerning the wireless device having the "device EUI64" of ZZZZ:ZZZZ:ZZZZ:ZZZZ. For this reason, the provisioning information A1 included in the join history information allocated with the sequential number "4" is set to the wireless device, thereby making it possible to set the state of that wireless device to the state as before reprovisioning (second provisioning).

Next, operation of the wireless communication system 1 having the above configuration is explained. Hereinafter, operation to be performed in a case where provisioning is performed on the wireless device 11 to cause the wireless device 11 to participate in the wireless communication network N1 (provisioning joining operation), and operation to be performed in a case where reprovisioning is performed on the wireless device 11 to cause the wireless device 11 to participate in the wireless communication network N1 (reprovisioning joining operation), are sequentially explained. Here, it is assumed in the provisioning joining operation that provisioning has not yet been performed on the wireless device 11, and it is assumed in the reprovisioning joining operation that provisioning has previously been performed on the wireless device 11.

(Provisioning Joining Operation)

Figure 3:
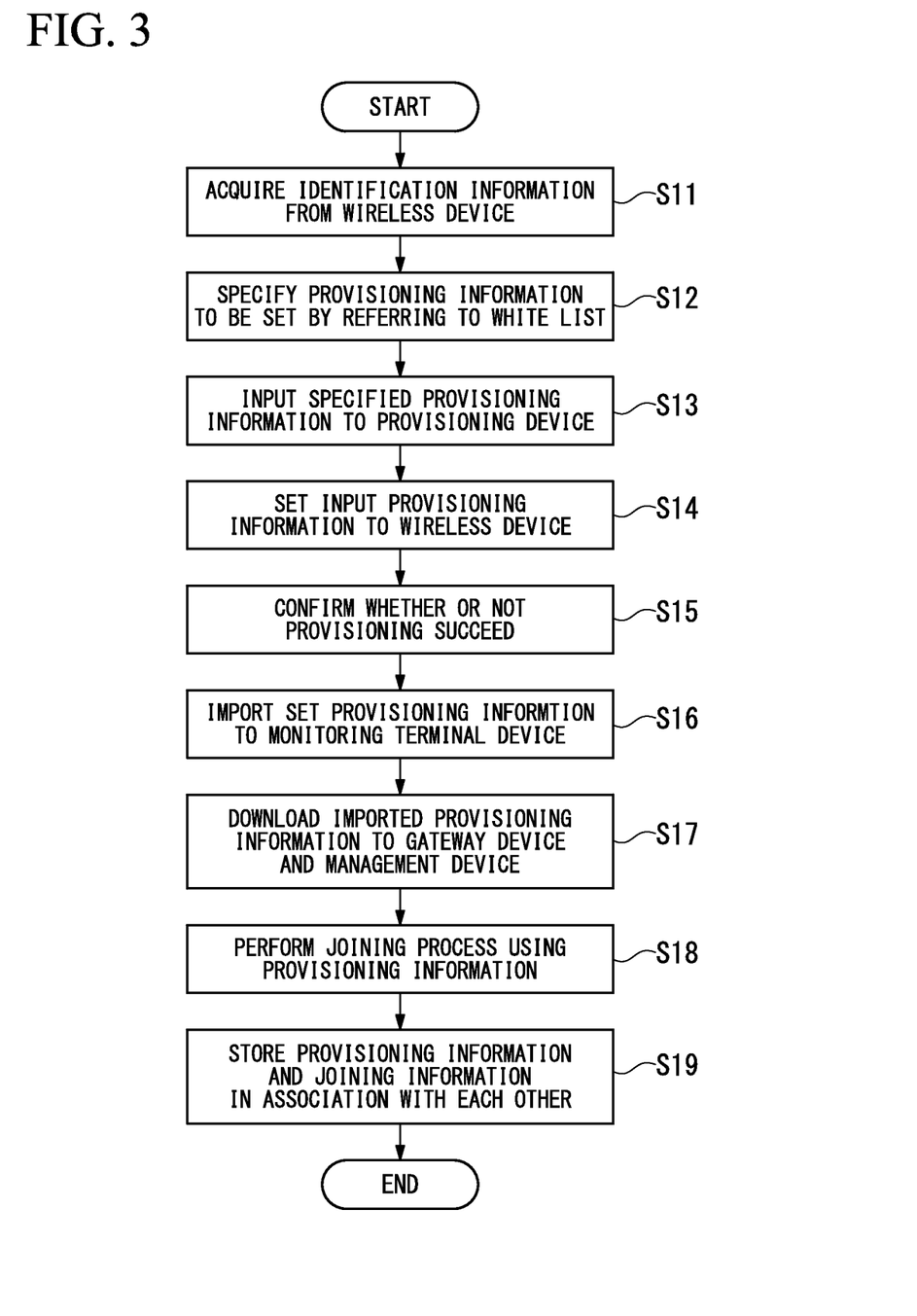
FIG. 3 is a flowchart illustrating provisioning joining operation according to the embodiment of the present invention.

FIG. 3 is a flowchart illustrating the provisioning joining operation according to the embodiment of the present invention. First, when an operator orders acquisition of identification information by operating the provisioning device 50, the provisioning device 50 communicates with the wireless device 11, and thus acquires the identification information set to the wireless device 11 (step S11). Specifically, the provisioning device 50 acquires address information or the like in EUI64 format that is 64-bit information allocated to the wireless device 11.

When the identification information is acquired, the operator refers to the previously prepared white list (correspondence table in which identification information of a wireless device is associated with provisioning information to be set to that wireless device), and thus specifies provisioning information to be set to the wireless device 11 having the acquired identification information (step S12). Then, the operator inputs the specified provisioning information to the provisioning device 50 by operating the provisioning device 50 (step S13).

When the operator orders setting of the provisioning information by operating the provisioning device 50 after inputting the provisioning information, provisioning is performed on the wireless device 11. Thus, the provisioning information input to the provisioning device 50 is set to the wireless device 11 (step S14: first step). For simplification of explanation, it is assumed here that the OOB provisioning using infrared communication function is performed. After the provisioning is performed, the operator confirms whether or not the provisioning succeeds (whether or not setting of the provisioning information to the wireless device 11 is successfully completed) (step S15).

The provisioning process ends when the operator confirms the success of the provisioning. Here, for simplification of explanation, a case where provisioning is performed on one wireless device 11 is explained here. However, in a case where there are other wireless devices to be subjected to provisioning, operation from steps S11 to S15 is repeated the number of times equal to the number of wireless devices.

When the provisioning process with respect to the wireless device 11 ends, the provisioning information set to the wireless device 11 is imported from the provisioning device 50 to the monitoring terminal device 30 (step S16). For example, the provisioning information is attached to an electronic mail and sent from the provisioning device 50 to the monitoring terminal device 30, thus importing the provisioning information to the monitoring terminal device 30. Alternatively, the operator carries the provisioning device 50 to the installed position of the monitoring terminal device 30, and infrared communication is performed between the provisioning device 50 and the monitoring terminal device 30, thus importing the provisioning information to the monitoring terminal device 30.

After the provisioning information is imported, the monitoring terminal device 30 downloads the provisioning information to the gateway 20 and the management device 40 (step S17). Here, the monitoring terminal device 30 downloaded the provisioning information to the gateway 20 and the management device 40 before the gateway 20 receives from the wireless device 11, a request for participating in the wireless communication network (as will be explained below). When a participation request (joining request; first request for the first wireless device to join the wireless communication network) is received from the wireless device 11 after the provisioning information is downloaded, the gateway 20 performs the joining process on the wireless device 11 using the provisioning information downloaded in step S17 (step S18: second step).

Here, if the provisioning information set to the wireless device 11 is equal to the provisioning information downloaded to the gateway 20, the gateway 20 allows the wireless device 11 to participate in the wireless communication network N1 (successful joining). On the other hand, if the provisioning information set to the wireless device 11 is not equal to the provisioning information downloaded to the gateway 20, the gateway 20 prohibits the wireless device 11 from participating in the wireless communication network N1 (unsuccessful joining).

After the joining process ends, joining information indicating a result of the joining process is transmitted from the gateway 20 to the management device 40. Then, the management device 40 generates join history information including the provisioning information downloaded in step S17 and the joining information transmitted from the gateway 20 which are associated with each other, and stores the generated join history information in the join history database DB (step S19: third step).

(Reprovisioning Joining Operation)

Figure 4:
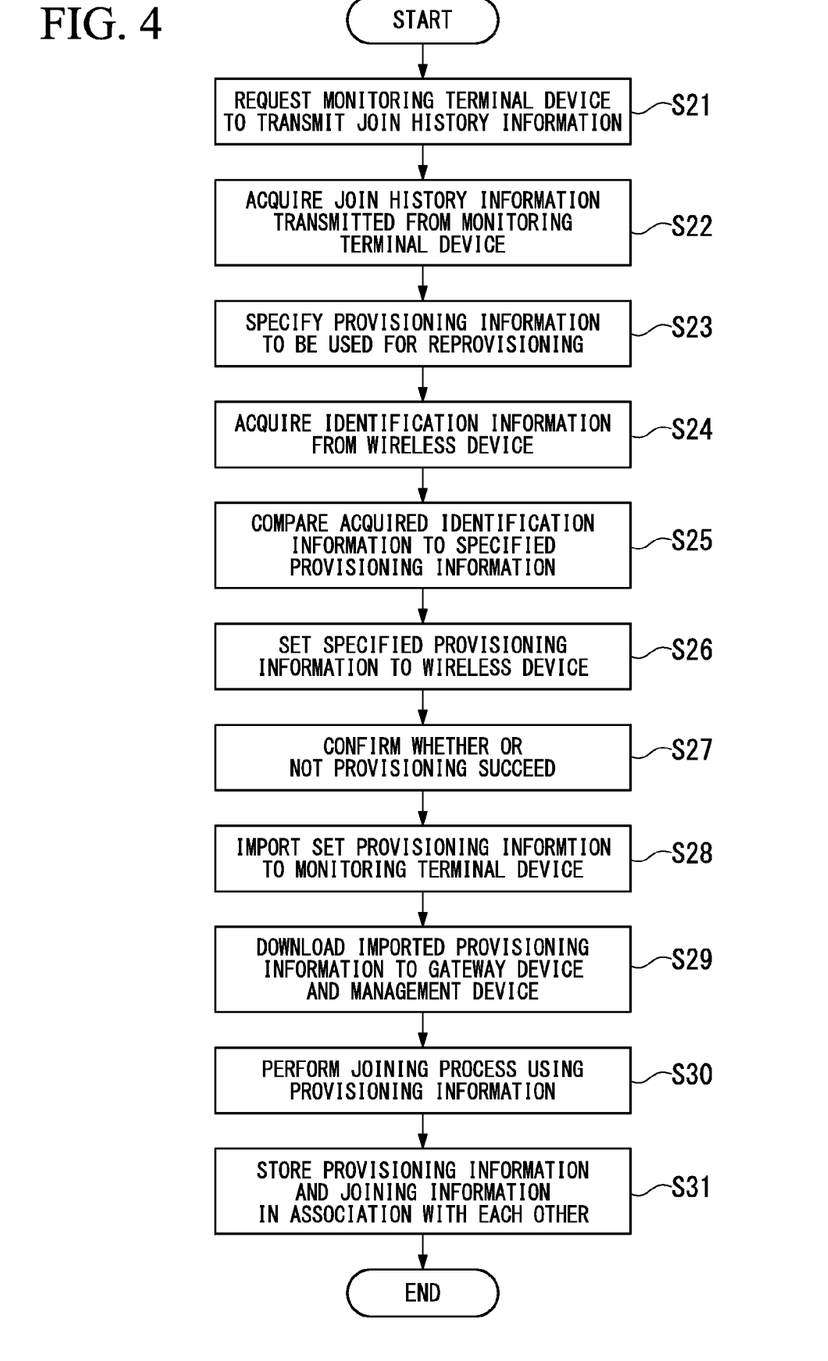
FIG. 4 is a flowchart illustrating reprovisioning joining operation according to the embodiment of the present invention.
Figure 5:
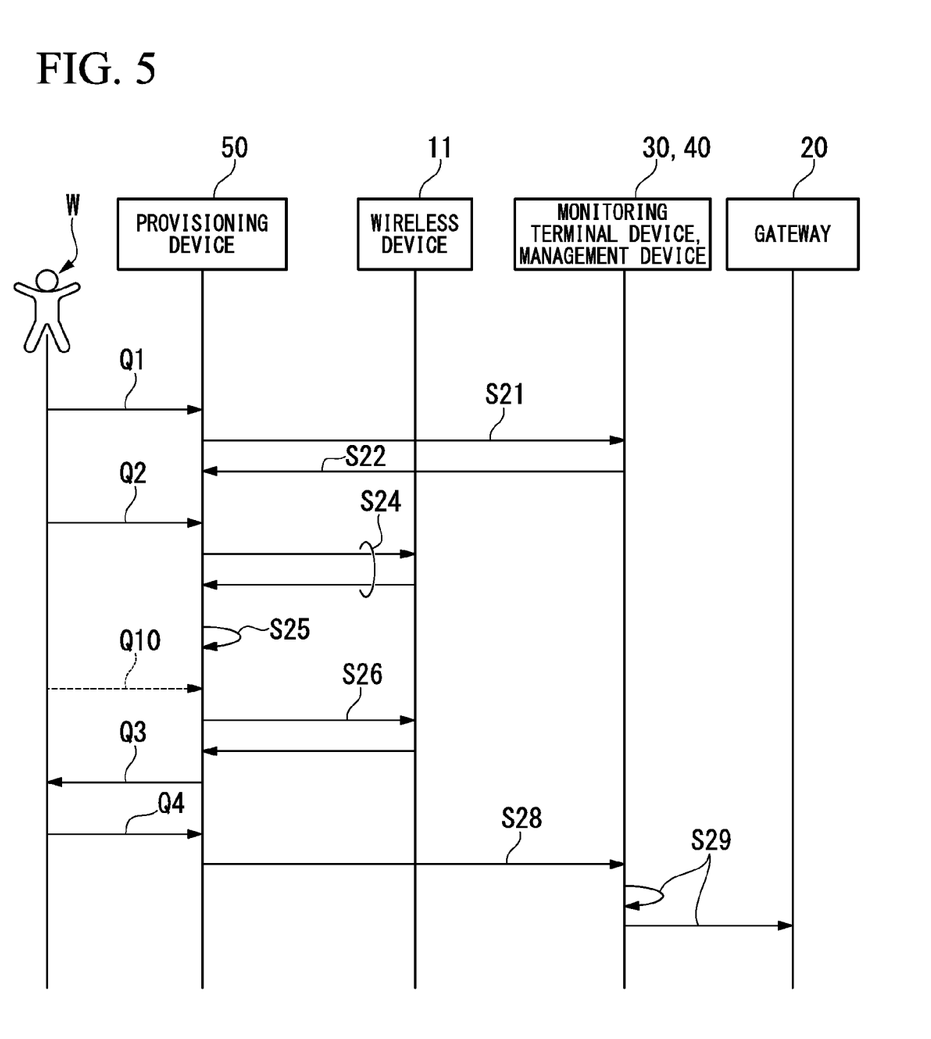
FIG. 5 is a timing chart illustrating reprovisioning joining operation according to the embodiment of the present invention.

FIG. 4 is a flowchart illustrating the reprovisioning joining operation according to the embodiment of the present invention. Additionally, FIG. 5 is a timing chart illustrating the reprovisioning joining operation according to the embodiment of the present invention. First, an operator W (user) orders acquisition of the join history information managed by the management device 40, by operating the provisioning device 50 (order Q1). Then, the provisioning device 50 accesses the monitoring terminal device 30 via the broadband wireless communication network, and requests the monitoring terminal device 30 to transmit the join history information (step S21).

Upon receiving the transmission request from the provisioning device 50 (a fourth request for acquiring the first join history information), the monitoring terminal device 30 requests the management device 40 to provide the contents of the join history database DB. Then, the monitoring terminal device 30 transmits to the provisioning device 50, the contents of the join history database DB provided from the management device 40. Thus, the contents of the join history database DB (join history information) is acquired by the provisioning device 50 (step S22: fourth step).

When the join history information is acquired by the provisioning device 50, the contents of the join history information are displayed on the provisioning device 50. For example, as shown in FIG. 2, a list of join history informations each including the provisioning information A1, the joining information B1, and the supplemental information C1 which are associated with one another, is displayed on the provisioning device 50. After the join history informations are displayed, the operator W orders specification of one of the displayed join history informations (join history information including provisioning information to be used for reprovisioning) by operating the provisioning device 50 (order Q2). Then, the provisioning device 50 performs a process of specifying provisioning information to be used for reprovisioning (step S23).

After the provisioning device 50 specifies provisioning information to be used for reprovisioning, the provisioning device 50 communicates with the wireless device 11 and acquires identification information set to the wireless device 11 (specifically, address information or the like in EUI64 format, which is 64-bit information allocated to the wireless device 11) (step S24). Then, the provisioning device 50 compares the identification information acquired in step S24 to the identification information included in the provisioning information specified in step S23 (specifically, "device EUI64" shown in FIG. 2; first identification information) (step S25). This comparison is performed in order to set the provisioning information only to the wireless device to which identification information equal to the identification information (first identification information) included in the provisioning information specified in step S23.

As a result of the above comparison, if the identification information acquired in step S24 is not equal to the identification information included in the provisioning information specified in step S23, the provisioning device 50 terminates a series of processes of the flowchart shown in FIG. 4. On the other hand, if the identification information acquired in step S24 is equal to the identification information included in the provisioning information specified in step S23, the provisioning device 50 performs reprovisioning on the wireless device 11. Thus, the provisioning information specified in step S23 (i.e., provisioning information having previously been set to the wireless device 11) is set to the wireless device 11 (step S26).

After the reprovisioning is performed, information indicating a result of the reprovisioning is transmitted from the wireless device 11 to the provisioning device 50, and the contents of the result are displayed on the provisioning device 50. After the contents of the result are displayed, the operator W confirms whether or not the provisioning has succeeded (setting of the provisioning information to the wireless device 11 is successfully completed) (confirmation Q3) (step S27).

When the operator W orders termination of the confirmation by operating the provisioning device 50 after the confirmation Q3 ends (i.e., in a case where from the result of the reprovisioning displayed on the provisioning device 50, the user confirms that the first information has successfully been set to the first wireless device), the provisioning information set to the wireless device 11 is imported from the provisioning device 50 to the monitoring terminal device 30 (step S28). Here, the import of the provisioning information is performed in a way such that an electronic mail with the provisioning information attached thereto is transmitted from the provisioning device 50 to the monitoring terminal device 30, or the provisioning information is transmitted by infrared communication from the provisioning device 50 to the monitoring terminal device 30.

After the provisioning information is imported, the monitoring terminal device 30 downloads the provisioning information to the gateway 20 and the management device 40 (step S29). After the provisioning information is downloaded, the wireless device 11 enters a state of being able to request participating in the wireless communication network N1 (joining request). When the participation request (joining request; first request) is received from the wireless device 11, the gateway 20 performs the joining process on the wireless device 11 using the provisioning information downloaded in step S29 (step S30).

Here, if the provisioning information set to the wireless device 11 is equal to the provisioning information downloaded to the gateway 20 (i.e., in a case where the first information is set to the first wireless device), the gateway 20 allows the wireless device 11 to participate in the wireless communication network N1 (successful joining). On the other hand, if the provisioning information set to the wireless device 11 is not equal to the provisioning information downloaded to the gateway 20, the gateway 20 prohibits the wireless device 11 from participating in the wireless communication network N1 (unsuccessful joining) Here, the case where the provisioning information set to the wireless device 11 is not equal to the provisioning information downloaded to the gateway 20 includes, for example, a case where a wireless device (second wireless device) different from the wireless device 11 (first wireless device) transmits to the gateway 20, a request for participating in the wireless communication network N1 (joining request; second request), or a case where although the provisioning information has not successfully been set to the wireless device 11 (first wireless device), the operator W falsely recognizes in step S27 that setting of the provisioning information has successfully been completed.

After the above joining process ends, joining information indicating a result of the joining process is transmitted from the gateway 20 to the management device 40. Then, the management device 40 generates join history information including the provisioning information downloaded in step S17 and the joining information received from the gateway 20 which are associated with each other (see FIG. 2), and stores the generated join history information in the join history database DB (step S31).

Here, the reprovisioning joining operation explained above is a process of resetting to the wireless device 11, the provisioning information having previously been set to the wireless device 11, as it is. However, it is possible to set to the wireless device 11 by reprovisioning, provisioning information different from the provisioning information having previously been set to the wireless device 11. For example, after the process in step S25 shown in FIGS. 4 and 5, part or all of the provisioning information (first information) specified in step S23 is changed in accordance with the order Q10 from the operator W (for example, only "network ID" shown in FIG. 2 is changed), thereby making it possible to set to the wireless device 11, provisioning information different from the provisioning information previously set.

As explained above, in the present embodiment, the join history information is stored in the join history database DB of the management device 40. The join history information includes: the provisioning information set to the wireless device 11 using the provisioning device 50; and the joining information indicating a result of the joining process of determining whether or not to allow the wireless device 11 to participate in the wireless communication network N1. The join history information is provided to the provisioning device 50 in accordance with a request from the provisioning device 50. For this reason, it is possible to efficiently perform reprovisioning using the provisioning information included in the provided join history information, thus reducing erroneous operation.

Additionally, in the present embodiment, the identification information acquired from the wireless device 11 and the identification information included in the join history information provided from the management device 40 are compared. If those identification informations are equal to each other, reprovisioning is performed. Thus, it is possible to prevent an accident such that reprovisioning is performed on a wireless device different from the wireless device intended by the operator.

Although the wireless communication system and the information providing method according to the embodiment of the present invention have been explained above, the present invention is not limited to the above embodiment, and various modifications may be made without departing from the present invention. For example, in the above embodiment, the provisioning information input to the provisioning device 50 by user operation is stored in the join history database DB of the management device 40. Conversely, however, a configuration may be made such that provisioning information to be set to the wireless device is previously generated and stored in the join history database DB, and that provisioning information is input to the provisioning device 50.

Here, the provisioning information stored in the join history database DB is transmitted from the management device 40 to the provisioning device 50 via, for example, a broadband wireless communication network. Thus, it is possible to omit a process for the operator to input provisioning information to the provisioning device 50 by referring to the white list. For this reason, it is possible to prevent an erroneous input of provisioning information to the provisioning device 50. Here, in a case where provisioning information is previously generated and stored in the join history database DB, provisioning information is transmitted from the management device 40 to the provisioning device 50 and the gateway 20. For this reason, the processes in steps S16 and S17 shown in FIG. 3 are omitted. Additionally, in this case, the management device 40 updates, in step S31, the second information included in the join history information (first join history information) based on a result of the joining process (a result of determination of whether or not to accept the first request) transmitted from the gateway 20.

Further, explanation has been made in the above embodiment with respect to the case where the management device 40 manages the join history database DB, and the contents of the join history database DB is provided to the provisioning device 50 when a request is received from the provisioning device 50. However, a database similar to the join history database DB managed by the management device 40, which is synchronized with the join history database DB, may be provided in the provisioning device 50. Thus, the provisioning device 50 can acquire join history information without transmitting to the monitoring terminal device 30, a request for transmission of the join history information.

Moreover, explanation has been made in the above embodiment with respect to the case where the monitoring terminal device 30 provides to the provisioning device 50, the contents of the join history database DB managed by the management device 40 of the monitoring terminal device 30, when a request is received from the provisioning device 50. However, as long as security is ensured, the provisioning device 50 may be allowed to access the management device 40, so that the management device 40 provides directly to the provisioning device 50, the contents of the join history database DB managed by the management device 40, when a request is received from the provisioning device 50. In this case, the provisioning device 50 provides the provisioning information specified by a user to the gateway 20 and the management device 40 before the gateway 20 receives from the wireless device 11, a request (first request) for participating in the wireless communication network. Thus, when the request (first request) for participating in the wireless communication network is received, the gateway 20 can determine whether or not to allow the wireless device 11 to participate in the wireless communication network, based on the provisioning information received from the provisioning device 50.

Additionally, explanation has been made in the above embodiment with respect to the case where when a request (a third request for acquiring the first join history information) is received from the provisioning device 50, the contents of the join history database DB managed by the management device 40 are provided to the provisioning device 50 without consideration of the type of the wireless device. However, when information (third information) for specifying the wireless device (first wireless device) is transmitted together with the above request (third request) from the provisioning device 50 to the management device 40, the management device 40 may specify, from multiple join history informations, only the join history information (first join history information) concerning the wireless device (first wireless device) specified by that transmitted information (third information), and provide the specified join history information (first join history information) to the provisioning device 50.

Further, for simplification of explanation, explanation has been made in the above embodiment with respect to the case where provisioning and reprovisioning are performed on the wireless device 11 not participating in the wireless communication network N1. However, reprovisioning can be similarly performed on the wireless devices 10a to 10c participating in the wireless communication network N1. In such a case where reprovisioning is performed on those wireless devices 10a to 10c, there is possibility that reprovisioning will be performed against the operator's intention. For this reason, it is preferable to perform countermeasures such as the following (1) to (4).

(1) Display a confirmation message before performing reprovisioning

For example, before provisioning information is set to a wireless device, the provisioning device displays a confirmation message, such as "This is a currently joining device. If reprovisioning is performed, communication with the gateway is disconnected. Is this OK?". Such a confirmation message can urge the operator to be careful.

(2) Limit provisioning devices that can perform reprovisioning

For example, a configuration is made such that only the provisioning device, to which provisioning information for reprovisioning is input, can perform reprovisioning. In other words, the provisioning device, to which the provisioning information for reprovisioning has not been input, is not allowed to perform reprovisioning on the wireless device participating in the wireless communication network.

(3) Limit operators allowed to perform reprovisioning

For example, the provisioning device operated by a particular operator is allowed to perform reprovisioning. Specifically, an operator allowed to perform reprovisioning is previously set. Then, reprovisioning is allowed to perform only when that operator logs on the provisioning device 50.

(4) Limit reprovisioning in accordance with an operation mode of the provisioning device For example, an "initial provisioning mode" and a "reprovisioning mode" are provided in the provisioning device. Then, the provisioning device is allowed to perform reprovisioning on the wireless device participating in the wireless communication network only when the provisioning device is operated in the "reprovisioning mode".

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

It is apparent that the present invention is not limited to the above embodiments, and may be modified and changed without departing from the scope and spirit of the invention.

What is claimed is:

1. A wireless communication system comprising:
   a setting device configured to receive an identification information from a first wireless device, the setting device being configured to set a provisioning information to the first wireless device, the identification information being used for identifying the first wireless device, the provisioning information being specified by using the identification information and being required for the first wireless device to join a wireless communication network;
   a control device configured to receive the provisioning information from the setting device, the control device being configured to determine, using the provisioning information, whether or not to allow the first wireless device transmitting a request for joining the wireless communication network to join the wireless communication network, and the control device being configured to generate a joining information indicating a result of the determination; and
   a management device configured to receive the provisioning information from the setting device, the management device being configured to receive the joining information from the control device, the management device being configured to generate a join history information for each wireless device, the join history information including the provisioning information and the joining information which are associated with each other,
   wherein in a case that the setting device transmits a request for acquiring the join history information, the management device provides the join history information to the setting device in response to the request for acquiring the join history information from the setting device, and
   the setting device is configured to
      display a list of join history information provided by the management device,
      specify a provisioning information to be used for reprovisioning based on an order of an operator, and
      perform the reprovisioning on the first wireless device by using the provisioning information specified by the setting device.

2. The wireless communication system according to claim 1, wherein the setting device is configured to set to the first wireless device, the provisioning information specified by a user from the join history information provided by the management device.

3. The wireless communication system according to claim 2, wherein the provisioning information includes identification information that identifies a wireless device, and
   the setting device is configured to set the provisioning information specified by the user to the first wireless device, in a case that the identification information included in the provisioning information specified by the user is equal to identification information acquired from the first wireless device to be set the provisioning information specified by the user.

4. The wireless communication system according to claim 1, wherein the setting device is configured to change, in accordance with an instruction from a user, the provisioning information included in the join history information provided by the management device.

5. The wireless communication system according to claim 1, wherein the setting device is configured to store join history information synchronized with the join history information managed by the management device.

6. An information providing method for a control device, comprising:
   controlling a setting device to set a provisioning information to a first wireless device, the setting device being configured to receive an identification information from the first wireless device, the identification information being used for identifying the first wireless device, the provisioning information being specified by using the identification information and being required for the first wireless device to join a wireless communication network;
   receiving the provisioning information from the setting device;
   determining, using the provisioning information, whether or not to allow the first wireless device transmitting a request for joining the wireless communication network to join the wireless communication network;
   generating, by a management device, a join history information for each wireless device, the join history information including the provisioning information and the joining information which are associated with each other;
   providing, by the management device, the join history information, in a case that the setting device transmits a request for acquiring the join history information, to the setting device in response to the request for acquiring the join history information from the setting device, displaying a list of join history information provided by the management device, specifying a provisioning information to be used for reprovisioning based on an order of an operator, and performing the reprovisioning on the first wireless device by using the provisioning information specified by the setting device.

7. The information providing method according to claim 6, wherein controlling the setting device comprises controlling the setting device to set the provisioning information to the first wireless device in a case that an identification information equals to the identification information included in the provisioning information is set to the first wireless device.

8. The information providing method according to claim 7, wherein determining whether or not to allow the first wireless device to join the wireless communication network comprises:

determining whether or not the provisioning information is set to the first wireless device; and allowing the first wireless device to join the wireless communication network in a case that it is determined that the provisioning information is set to the first wireless device.

9. A wireless communication system comprising:

a first wireless device;

a management device configured to manage a first join history information including a provisioning information and a joining information, the provisioning information being required for the first wireless device to join a wireless communication network, and the joining information indicating a history of the first wireless device concerning previous join in the wireless communication network;

a setting device configured to acquire the first join history information from the management device, and set to the first wireless device, the provisioning information included in the first join history information; and a control device configured to receive the provisioning information from the setting device, and in a case that a first request for joining the wireless communication network is received from the first wireless device, determine whether or not to accept the first request based on the provisioning information, wherein the management device is configured to receive the provisioning information from the setting device, receive the joining information from the control device, and generate the join history information including the provisioning information and the joining information which are associated with each other, and the setting device is configured to display a list of join history information acquired from the management device, specify a provisioning information to be used for reprovisioning based on an order of an operator, and perform the reprovisioning on the first wireless device by using the provisioning information specified by the setting device.

10. The wireless communication system according to claim 9, wherein the control device is configured to receive the provisioning information from the setting device before the first request is received from the first wireless device.

11. The wireless communication system according to claim 9, wherein the provisioning information includes a first identification information, and the setting device is configured to set the provisioning information to the first wireless device in a case that an identification information equals to the first identification information is set to the first wireless device.

12. The wireless communication system according to claim 9, wherein the control device is configured to accept the first request in a case that the provisioning information is set to the first wireless device.

13. The wireless communication system according to claim 12, wherein the control device is configured to, in a case that a second request for joining the wireless communication network is received from a second wireless device to which the provisioning information is not set, reject the second request.

14. The wireless communication system according to claim 9, wherein the setting device is configured to transmit the provisioning information to the control device in a case that the provisioning information is successfully set to the first wireless device.

15. The wireless communication system according to claim 14, wherein the setting device is configured to display a result of setting of the provisioning information to the first wireless device, and transmit the provisioning information to the control device in a case that a user confirms that the result of the setting is successful.

16. The wireless communication system according to claim 9, wherein the control device is configured to transmit to the management device, a result of determination of whether or not to accept the first request, and the management device is configured to update the joining information included in the first join history information based on the result of the determination.

17. The wireless communication system according to claim 9, wherein the setting device is configured to change the provisioning information in accordance with a user instruction and set the provisioning information changed to the first wireless device.

18. The wireless communication system according to claim 9, wherein the management device is configured to store a plurality of join history informations including the first join history information, and the setting device is configured to acquire from the management device, the first join history information selected by a user from the join history informations.

19. The wireless communication system according to claim 9, wherein the setting device is configured to transmit to the management device, a third request for acquiring the first join history information with a third information specifying the first wireless device, and the management device is configured to store a plurality of join history informations including the first join history information, specify the first join history information from the plurality of join history informations based on the third request, and transmit the first join history information specified to the setting device.

20. The wireless communication system according to claim 9, further comprising:

a monitoring terminal device configured to, in a case that a fourth request for acquiring the first join history information is received from the setting device, acquire the first join history information from the management device, and transmit the first join history information acquired to the setting device, and wherein the setting device is configured to transmit the provisioning information to the control device via the monitoring terminal device.

* * * * *